United States Patent
Funaki

(10) Patent No.: US 8,024,208 B2
(45) Date of Patent: Sep. 20, 2011

(54) SHIPPING PLANNING SYSTEM

(75) Inventor: Kenichi Funaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1077 days.

(21) Appl. No.: 11/685,952

(22) Filed: Mar. 14, 2007

(65) Prior Publication Data

US 2007/0219836 A1    Sep. 20, 2007

(30) Foreign Application Priority Data

Mar. 15, 2006   (JP) ................................. 2006-070160

(51) Int. Cl.
*G06Q 10/00* (2006.01)
(52) U.S. Cl. ............... 705/7.11; 705/8; 705/9; 705/7.25
(58) Field of Classification Search .................. 705/7, 8, 705/9
See application file for complete search history.

(56) References Cited

U.S. PATENT DOCUMENTS

| | | | | |
|---|---|---|---|---|
| 5,630,070 | A * | 5/1997 | Dietrich et al. | 705/7.23 |
| 5,970,465 | A * | 10/1999 | Dietrich et al. | 705/7.22 |
| 7,130,809 | B1 * | 10/2006 | Fors | 705/7.22 |
| 7,139,719 | B1 * | 11/2006 | Cherneff et al. | 705/7.23 |
| 7,921,030 | B1 * | 4/2011 | Verma et al. | 705/1.1 |
| 2002/0103686 | A1 * | 8/2002 | Slocum | 705/8 |
| 2003/0208392 | A1 * | 11/2003 | Shekar et al. | 705/8 |
| 2004/0024628 | A1 * | 2/2004 | Eck et al. | 705/8 |
| 2005/0131779 | A1 * | 6/2005 | Kitamura et al. | 705/29 |
| 2006/0277086 | A1 * | 12/2006 | Ball et al. | 705/8 |

FOREIGN PATENT DOCUMENTS

| | | |
|---|---|---|
| JP | 6-138810 A | 5/1994 |
| JP | 2001-154722 | 6/2001 |
| JP | 2004-78273 A | 3/2004 |

OTHER PUBLICATIONS

Smith, G.E. et al, "Financial Analysis for Profit-drive Pricing", Sloan Management Review, Spring, 1994, pp. 71-84.

* cited by examiner

*Primary Examiner* — John W Hayes
*Assistant Examiner* — Brian Epstein
(74) *Attorney, Agent, or Firm* — Mattingly & Malur P.C.

(57) ABSTRACT

The shipping planning system stores price/quantity relationship data for products in advance, calculates additional variable cost for shipping quantity for each product based on available resource and inventory, procured resource amount, procurement lead time, and available facility capability, evaluates relative profit subtracting opportunity loss of other products which shares the resources from a margin profit of the product using the additional variable cost, and determines the product to be shipped which makes the relative profits positive, and a shipping quantity and a price of the product using the price/quantity relationship data.

5 Claims, 25 Drawing Sheets

FIG. 4

RESOURCE CONFIGURATION MASTER

| PRODUCT | STEP | RESOURCE | REQUIRED AMOUNT |
|---|---|---|---|
| PRODUCT A | ASSEMBLY | MATERIAL a | ONE PIECE |
| PRODUCT A | ASSEMBLY | MATERIAL b | ONE PIECE |
| PRODUCT A | ASSEMBLY | FACILITY 1 | ONE UNIT |
| PRODUCT B | ASSEMBLY | MATERIAL b | TWO PIECES |
| PRODUCT B | ASSEMBLY | MATERIAL c | ONE PIECE |
| PRODUCT B | ASSEMBLY | FACILITY 1 | ONE UNIT |
| PRODUCT B | ASSEMBLY | MATERIAL b | ONE PIECE |
| PRODUCT B | ASSEMBLY | MATERIAL c | ONE PIECE |
| PRODUCT B | ASSEMBLY | MATERIAL d | ONE PIECE |
| PRODUCT B | ASSEMBLY | FACILITY 1 | ONE UNIT |

FIG. 5

RESOURCE MASTER

| RESOURCE | PROCUREMENT LEAD TIME | PROCUREMENT COST (UNIT PRICE) |
|---|---|---|
| MATERIAL a | THREE WEEKS | 40YEN |
| MATERIAL b | TWO WEEKS | 40YEN |
| MATERIAL c | THREE WEEKS | 10YEN |
| MATERIAL d | FIVE WEEKS | 30YEN |
| FACILITY 1 | UNAVAILABLE | – |

FIG. 6

MATERIAL INVENTORY DATA    MATERIAL STORAGE PLANNING DATA

| | THE NUMBER OF CURRENT INVENTORY | WEEK | 1 | 2 | 3 | 4 | 5 | 6 | 7 |
|---|---|---|---|---|---|---|---|---|---|
| MATERIAL a | 80 | AMOUNT OF PLANNED STORAGE | 80 | 80 | 80 | | | | |
| | | ACCUMULATIVE AVAILABLE AMOUNT | 160 | 240 | 320 | | | | |
| MATERIAL b | 500 | AMOUNT OF PLANNED STORAGE | 400 | 400 | | | | | |
| | | ACCUMULATIVE AVAILABLE AMOUNT | 900 | 1300 | | | | | |
| MATERIAL c | 300 | AMOUNT OF PLANNED STORAGE | 200 | 200 | 200 | | | | |
| | | ACCUMULATIVE AVAILABLE AMOUNT | 500 | 700 | 900 | | | | |
| MATERIAL d | 200 | AMOUNT OF PLANNED STORAGE | 100 | 200 | 100 | 200 | 100 | | |
| | | ACCUMULATIVE AVAILABLE AMOUNT | 300 | 500 | 600 | 800 | 900 | | |

FIG. 7

PRODUCTION CAPACITY DATA

| | WEEK | 1 | 2 | 3 | 4 | 5 | 6 | 7 |
|---|---|---|---|---|---|---|---|---|
| FACILITY 1 | AVAILABLE CAPACITY | 1000 | 1000 | 1000 | 1000 | 1000 | 1000 | 1000 |

FIG. 9

PRODUCT A

| WEEK | FIRST WEEK | SECOND WEEK | THIRD WEEK | FOURTH WEEK | FIFTH WEEK | FIFTH WEEK | SIXTH WEEK | SEVENTH WEEK | EIGHTH WEEK | NINTH WEEK |
|---|---|---|---|---|---|---|---|---|---|---|
| ACCUMULATIVE AVAILABLE SHIPPING QUANTITY | 80 | 160 | 240 | 320 | 1300 | 1320 | 2320 | 3320 | 4320 | 5320 |
| ADDITIONAL PROCURED RESOURCE | NONE | NONE | NONE | NONE | MATERIAL a (980) | MATERIAL a (20) MATERIAL b (20) | MATERIAL a (1000) MATERIAL b (1000) | MATERIAL a (1000) MATERIAL b (1000) | MATERIAL a (1000) MATERIAL b (1000) | MATERIAL a (1000) MATERIAL b (1000) |

FIG. 10

PRODUCT B

| WEEK | FIRST WEEK | SECOND WEEK | THIRD WEEK | FOURTH WEEK | FIFTH WEEK | SIXTH WEEK | SEVENTH WEEK | EIGHTH WEEK | NINTH WEEK | TENTH WEEK |
|---|---|---|---|---|---|---|---|---|---|---|
| ACCUMULATIVE AVAILABLE SHIPPING QUANTITY | 250 | 450 | 650 | 900 | 1900 | 2900 | 3900 | 4900 | 5900 | 6900 |
| ADDITIONAL PROCURED RESOURCE | NONE | NONE | NONE | MATERIAL b (500) | MATERIAL b (2000) MATERIAL c (1000) | MATERIAL b (2000) MATERIAL c (1000) | MATERIAL b (2000) MATERIAL c (1000) | MATERIAL b (2000) MATERIAL c (1000) | MATERIAL b (2000) MATERIAL c (1000) | MATERIAL b (2000) MATERIAL c (1000) |

FIG. 11

PRODUCT C

| WEEK | FIRST WEEK | SECOND WEEK | THIRD WEEK | FOURTH WEEK | FIFTH WEEK | SIXTH WEEK | SEVENTH WEEK | SEVENTH WEEK | EIGHTH WEEK | NINTH WEEK |
|---|---|---|---|---|---|---|---|---|---|---|
| ACCUMULATIVE AVAILABLE SHIPPING QUANTITY | 200 | 300 | 500 | 600 | 800 | 900 | 1300 | 1900 | 2900 | 3900 |
| ADDITIONAL PROCURED RESOURCE | NONE | NONE | NONE | NONE | NONE | NONE | MATERIAL c (400) MATERIAL d (400) | MATERIAL b (600) MATERIAL c (600) MATERIAL d (600) | MATERIAL b (1000) MATERIAL c (1000) MATERIAL d (1000) | MATERIAL b (1000) MATERIAL c (1000) MATERIAL d (1000) |

FIG. 12

PRODUCT A

| | 1 | 2 | ~ | 319 | 320 | 321 | 322 | ~ | 1299 | 1300 | 1301 | 1302 |
|---|---|---|---|---|---|---|---|---|---|---|---|---|
| SHIPPING QUANTITY | | | | | | | | | | | | |
| ADDITIONAL VARIABLE COST | 0 | 0 | ~ | 0 | 0 | 40 | 80 | ~ | 39160 | 39200 | 39280 | 39360 |

FIG. 13

PRODUCT B

| | 1 | 2 | ... | 649 | 650 | 651 | 652 | ... | 899 | 900 | 901 | 902 |
|---|---|---|---|---|---|---|---|---|---|---|---|---|
| SHIPPING QUANTITY | | | | | | | | | | | | |
| ADDITIONAL VARIABLE COST | 0 | 0 | | 0 | 0 | 80 | 160 | | 19920 | 20000 | 20090 | 20180 |

FIG. 14

PRODUCT C

| | 1 | 2 | ... | 899 | 900 | 901 | 902 | ... | 1299 | 1300 | 1301 | 1302 |
|---|---|---|---|---|---|---|---|---|---|---|---|---|
| SHIPPING QUANTITY | 1 | 2 | | 899 | 900 | 901 | 902 | | 1299 | 1300 | 1301 | 1302 |
| ADDITIONAL VARIABLE COST | 0 | 0 | | 0 | 0 | 40 | 80 | | 15960 | 16000 | 16080 | 16160 |

PRODUCT C

RESOURCE SHARING RELATIONSHIP MATRIX

|  | PRODUCT A | PRODUCT B | PRODUCT C |
|---|---|---|---|
| PRODUCT A | – | 1.0 | 1.0 |
| PRODUCT B | 2.0 | – | 2.0 |
| PRODUCT C | 1.0 | 1.0 | – |

FIG. 23

SHIPPING QUANTITY / PRICE DECISION

RELATIVE PROFIT FOR EACH PRODUCT

| PRODUCT | SHIPPING QUANTITY | PRICE | MARGINAL PROFIT | RESOURCE SHARING PRODUCT | OPPORTUNITY LOSS | RELATIVE PROFIT |
|---|---|---|---|---|---|---|
| PRODUCT A | 320 PIECES | ¥150 | ¥46500 | PRODUCT B | ¥36000 | ¥29600 |
| | | | | PRODUCT C | ¥46500 | ¥0 |
| PRODUCT B | 640 PIECES | ¥140 | ¥89600 | PRODUCT A | ¥54200 | ¥35400 |
| | | | | PRODUCT C | ¥90000 | −¥400 |
| PRODUCT C | 810 PIECES | ¥130 | ¥105300 | PRODUCT A | ¥54200 | ¥51100 |
| | | | | PRODUCT B | ¥68200 | ¥37100 |

DECIDE

FIG. 24

| | CURRENT NUMBER OF INVENTORY | WEEK | 1 | 2 | 3 | 4 | 5 | 6 | 7 |
|---|---|---|---|---|---|---|---|---|---|
| MATERIAL a | 80 | AMOUNT OF PLANNED STORAGE | 80 | 80 | 80 | | | | |
| | | ACCUMULATIVE AVAILABLE AMOUNT | 160 | 240 | 320 | | | | |
| MATERIAL b | 0 | AMOUNT OF PLANNED STORAGE | 90 | 400 | | | | | |
| | | ACCUMULATIVE AVAILABLE AMOUNT | 90 | 490 | | | | | |
| MATERIAL c | 0 | AMOUNT OF PLANNED STORAGE | 0 | 0 | 90 | | | | |
| | | ACCUMULATIVE AVAILABLE AMOUNT | 0 | 0 | 90 | | | | |
| MATERIAL d | 0 | AMOUNT OF PLANNED STORAGE | 0 | 0 | 0 | 0 | 90 | | |
| | | ACCUMULATIVE AVAILABLE AMOUNT | 0 | 0 | 0 | 0 | 90 | | |

FIG. 25

| FACILITY 1 | WEEK | 1 | 2 | 3 | 4 | 5 | 6 | 7 |
|---|---|---|---|---|---|---|---|---|
| | AVAILABLE CAPACITY | 800 | 900 | 800 | 900 | 800 | 990 | 1000 |

FIG. 26

SHIPPING QUANTITY / PRICE PLANNING RESULT

|  | SHIPPING QUANTITY | PRICE | SALES | MARGINAL PROFIT |
|---|---|---|---|---|
| PRODUCT A | 480 PIECES | ¥150 | ¥72000 | ¥65600 |
| PRODUCT B | 570 PIECES | ¥150 | ¥85500 | ¥35500 |
| PRODUCT C | 810 PIECES | ¥130 | ¥105300 | ¥105300 |
|  |  | TOTAL | ¥262800 | ¥206400 | ately been incurred

SHIPPING PLANNING SYSTEM

INCORPORATION BY REFERENCE

The present application claims priority from Japanese application JP2006-070160 filed on Mar. 15, 2006, the content of which is hereby incorporated by reference into this application.

BACKGROUND OF THE INVENTION

1. Field of the Invention

The present invention relates to a shipping planning system for deciding the shipping quantity of a product and the price of the product so as to increase the profit in consideration of the relationship between the price and the demand and the available amount of the resource on hand and the additional procurement cost.

2. Description of Related Art

In the manufacturing industry, it is a key issue of when, how many and which products to produce and to ship to maximize the profit under the restriction of the limited resources. This issue is generally treated as a product mix issue with profit being the evaluation index. The solution for the issue has been conventionally researched and developed in the field of operations research. For example, the Linear Programming method is a typical approach to solve the problem how much of which product should be produced and shipped to maximize the profit under the restriction of the resources for a predetermined amount of demand of each product. In order to discretely treat the number of the products or resource consumption units in a more practical manner, the problem may be treated as a Combinatorial Optimization Problem to be solved by Mixed Integer Programming or various Heuristic Methods.

In order to evaluate the profit, the price of a product and the cost of producing the product need to be taken into consideration. In many of the conventional researches, the price of the product and the cost are treated as predetermined parameters being a fixed value for each product. However, if the problem is to be treated as a practical matter, the price and the cost need to be treated with attention to the points below.

As is demonstrated in the fields of economy or marketing, the price and the demand are often associated with each other. It may not be practical to consider the price being fixed regardless of the shipping quantity. Therefore, it is appropriate to take the price to be determined according to the shipping quantity instead of a previously given fixed value.

The cost is divided into a fixed cost that fixedly occurs regardless of the shipping quantity and a variable cost that is incurred according to the shipping quantity such as a procurement cost of a material. As the fixed cost is constant no matter what shipping quantity is set for each product, it is not appropriate to take the fixed cost into consideration in decision-making. Therefore, it is preferable to use the marginal profit that is calculated by the sales/variable cost for evaluating the profit by taking only the variable cost which is incurred according to the size of the shipment into consideration in examining when how much of which product is to be produced and shipped. For correct decision making, only the cost that fluctuates according to the result of the decision-making should be taken into consideration. As the cost that has occurred at the moment of the decision-making is the sunk cost from the viewpoint of an actual cost occurrence even if the cost is classified as the variable cost, the cost should not be incorporated in the profit evaluation. In the manufacturing industry, the material procurement cost can be classified as the variable cost according to the number of the product to be produced and the shipping quantity. The procurement cost of the material that has been incurred in the past and is determined to be stored is the cost that occurred regardless of the production and the shipment of the products thereafter; the cost should be subtracted in evaluating the profit when the profit is evaluated. That is to say, the variable cost for a product may change depending on whether the procurement cost of the material to be consumed has already been incurred or to be additionally incurred thereafter.

The above-mentioned practical requirements have been pointed out and have been recognized, but no technique for solving the problem with the requirements for both the price and the cost being actually taken into consideration for providing a solution has been developed yet.

A method for deciding the shipping quantity and the price so as to ensure the product by regarding the price as what changes depending on its relationship with the shipping quantity of a product is disclosed in "Financial Analysis for Profit-driven Pricing, G. E. Smith, T. T. Nagle Sloan Management Review, Spring 1994". That method is a method for selecting the price so as to ensure the profit according to the predicted fluctuation of the sold number when the current price is changed. With that method, the price is decided based on the Breakeven Sales Volume calculated by the formula below.

Breakeven Sales Volume=Current Contribution Margin×current number of sales/Modified Contribution Margin Here, Current Contribution Margin=current price−current variable cost, and Modified Contribution Margin=Modified price−Modified variable cost. If the predicted sales number ensures the Breakeven Sales Volume, it is determined that the price can be changed higher or lower. In that method, however, how the amount of resources to be consumed changes according to the shipping quantity is not taken into consideration. Thus, there is a problem in that the sunk cost can also be included in the variable cost used in the evaluation.

The invention disclosed in JP-A-2001-154722, for example, is a technique for deciding the shipping quantity, by which the additional procurement cost is the least, by excluding the procurement cost of the material that has been in the inventory from the variable cost as a sunk cost. In JP-A-2001-154722, a production planning system for eliminating a surplus material with the least loss by taking the material that has been in the inventory as the surplus material is provided. That system enables correct decision-making to be performed without incorporating the sunk cost in the cost evaluation by treating only the procurement cost of the material that needs to be additionally procured for producing a product with a surplus material as an additional variable cost. The price setting and the profit evaluation are not supported from the viewpoint of what price the product sells for against the demand (a method for presenting a price required for ensuring a profit based on the cost is shown).

As mentioned above, in the conventional technique, a method for deciding the shipping quantity and the price by a profit evaluation that takes into consideration both the relationship between the price and the demand and the relationship between the shipping quantity and the resource additional procurement cost at the same time has not been provided.

By focusing on a certain product, the price according to the shipping quantity and the additional procurement cost for the required resource change at the same time as the shipping quantity changes. Further, by taking it as a whole, a resource is generally shared by products, and the price and the additional procurement cost need to be obtained according to a combination of the shipping quantity of each product that satisfies the restriction on available capacity of the resource. As such, a matter of deciding the shipping quantity and the price so as to maximize the profit under the restriction of the available capacity of the resource is the combinatorial problem. Therefore, the problem could be solved by treating the problem as a mathematical optimizing problem in theory. As a structural reason that no technique for solving the problem has been provided so far, two points below can be thought of.

<Reason 1>

Changing the price of the product according to the shipping quantity means that a value of the sales that is required to calculate the profit is not always proportional to the shipping quantity, which is an operational variable. Thus, a simple Mathematical Optimization Method such as a linear planning method can not be applied.

<Reason 2>

In order to calculate the amount of resource consumed from the shipping quantity and obtain the additional procurement amount, a procedural algorithm based on a rule such as the Material Requirements Planning (MRP) or the production schedule needs to be used, which is difficult to incorporate simply into a mathematical programming model.

The reason below can also be considered from the viewpoint of good operability in actual application.

<Reason 3>

Even if an optimum solution can be obtained by treating the problem as a mathematical optimization problem, processes to induce such a solution are generally not known, thus, it is not necessarily a method easily accepted by a user.

SUMMARY OF THE INVENTION

In the present invention, a system that can decide the price and the shipping quantity for each product is provided so as to increase the profit by a method for taking change of the price and the additional procurement cost according to the shipping quantity into consideration at the same time, which is easily understood by a planner or the like, who is a user.

In order to solve the above-mentioned problem, the shipping planning system according to the present invention makes the most of the principal features below.

<Feature 1>

The price monotonously decreases as the shipping quantity increases (the price is not increased when many products are desired to be sold).

<Feature 2>

The additional variable cost monotonously increases as the shipping quantity increases (when a product is produced, the available resources on hand are consumed first and only the amount of the resources that is short for the production is additionally procured).

<Feature 3>

The number of a certain product available to be shipped monotonously decreases as the amount of available resources required to produce the product decreases (when the amount of available resources decreases due to production and shipment of a certain product, the available shipping quantity of other products that share the resources does not change or decreases).

<Feature 4>

With a procedural algorithm such as the MRP or production scheduling, always the same result is induced if the input data is the same. (With the same shipping quantity and the same amount of available resources (the amount of material inventory, the amount to be warehoused, the production capacity and the like), the same available shipping quantity or the additional procurement amount of the resources can be always obtained.)

According to feature 1 and feature 2, the marginal profit of a certain product is not monotonous to the shipping quantity. There is the shipping quantity for maximizing the marginal profit under the restriction of the amount of available resources. According to the feature 3, if the shipping quantity is decided, the available shipping quantity of other products that share the resources can be obtained based on the amount of the resources to be consumed by them. Further, according to the feature 4, if the additional procurement amount of the resources according to the number of other products to be shipped is previously calculated and when the number of a certain product to be shipped is decided, the marginal profit by other products that cannot be obtained due to the above decision (i.e., the Opportunity Loss) can be calculated.

The shipping planning system according to the present invention is adapted to determine the profit increase possibility only with simple calculation with the shipping quantity for each product being an operation variable, by making the most of the features, and giving the relationship between the shipping quantity and the price, and by using an algorithm such as the MRP or production scheduling and previously obtaining the available shipping quantity for each product or the additional variable cost according to the shipping quantity. It enables evaluation of the profit increase capability in consideration of the relationship of sharing resources between the products and restriction on the available amount of resources, by using the relative profit that is the marginal profit that can be obtained with the shipment of a certain product subtracted by the marginal profit that should have been obtained by other products that share the resources with the product as the Opportunity Loss for determining the profit increase capability, if the number of the product is decided.

Alternatively, in order to provide the invention as a technique that is easily accepted by a user, processes to decide the shipping quantity and the price of each product need to be easily understood and be visualized. Thus, the shipping planning system of the present invention is adapted to make the product for which the shipping quantity in one process and the price are to be decided the product which has the highest possibility of profit increase at that moment, repeat the process successively until there is no product for which the shipping quantity and the price are to be decided, and to be able to provide information that helps a user understand in the process to the user with the display unit such as a computer display.

Based on the above-mentioned idea, the shipping planning system according to the present invention is implemented with a configuration as below.

It is adapted as a shipping planning system for deciding the price and the shipping quantity for maximizing the profit of the product according to the relationship between the price and demand (the shipping quantity) and restriction on the available amount of the resource (material or facility), including:

a memory unit for storing;

a resource configuration master in which at least processes for producing each product, the resource (material or facility) required in the processes and a required amount of the resource are registered;

a resource master in which a period required for new procurement of the resource (material) (procurement lead time) and a procurement cost are registered;

a material inventory data in which the inventory amount of the material is registered;

a material storage planning data in which an amount of planned storage of said material is registered;

a production capacity data in which production capacity of the facility is registered; and a price/number relationship data in which the relationship between the price and the shipping quantity for each product are registered;

a calculating unit of the available shipping quantity for each product for calculating the available shipping quantity and an additional resource procurement amount for each product registered in the resource configuration master based on an amount of inventory available for each material that is registered in the material inventory data, an amount of planned storage available for each material that is registered in the inventory storage planning data, a procurement lead time for each material that is registered in the resource master, and an available capacity of the facility that is registered in the production capacity data;

a calculating unit of the additional variable cost for the shipping quantity for calculating additional variable cost according to the shipping quantity for each product based on the shipping quantity, the additional procured amount of resource calculated by the calculating unit of the available shipping quantity and the resource procurement cost registered in the resource master;

an analyzing unit of profit increase capability for each product for calculating a relative profit for each number of a specified product to be shipped with a difference between marginal profit procured by shipment of the specified product and marginal profit of another product that cannot be procured by the production of the product as relative profit by using an additional variable cost, the price/number relationship data and the resource configuration master for each shipping quantity calculated by the calculating unit of the additional variable cost for the shipping quantity being relative profit; and a deciding unit of the shipping quantity/price for deciding the shipping quantity corresponding to the maximal value and the price of the products corresponding to the shipping quantity by selecting another product with the least relative profit that has the least value in the positive number among the relative profit for the other product, comparing the maximal values of the least relative profit of respective specified products, and deciding the product with the maximal value as the product to be shipped.

Especially, the analyzing unit of profit increase capability for each product may calculate a marginal profit procured by shipment of a certain product X when resource Rn (n=1, 2, 3, ...) is commonly used in production of the product (product X) and another product (product Y) by using an additional variable cost for each shipping quantity calculated by the calculating unit of the additional variable cost for the shipping quantity, the price/number relationship data and the resource configuration master by Mx=(price corresponding to the shipping quantity of the product X)×(the shipping quantity of the product X)−(additional variable cost corresponding to the shipping quantity of the product X), calculating a shipment affection coefficient from the product X to the product Y by Exy=max{(usage of the resource Rn for each product X)/(usage of the resource Rn for each product Y)}, obtaining the least value of a value of the shipping quantity of the product X×a value of Exy, a value of the available shipping quantity of the product Y calculated by the calculating unit of the available shipping quantity for each product, and the maximal value of the shipping quantity of the product Y defined in the price/number relationship data as a number of the product Y that cannot be shipped according to the number of the product X, calculating the Opportunity Loss by the product Y by Ly=(price corresponding to the number of the product Y that cannot be shipped)×(the number of product Y that cannot be shipped)−(additional variable cost corresponding to the number of the product Y that cannot be shipped), and then calculating the relative profit for the product Y by shipment of the product X by Mx−Ly.

The deciding unit of shipping quantity/price may select the shipping quantity by which a relative profit of a certain product (product X) for all the other products becomes positive and the least value of the relative profit for the other products becomes maximum as the shipping quantity of the product X and also select a price according to the shipping quantity based on the relative profit for each shipping quantity for each product calculated by the analyzing unit of profit increase capability for each product, and register them as the shipping quantity/price plan.

In order to enable a user to easily understand a process for deciding a shipping plan, it may include a display unit for providing information for a user by making the shipping quantity by which the least value of relative profits of a certain product to other products is the maximum as the shipping quantity and making the price according to the shipping quantity as the price of the product based on the relative profit for each of the number of the product for each product calculated by the analyzing unit of profit increase capability for each product via a screen or a form sheet of paper, wherein the deciding unit of the shipping quantity/price receives a combination specified by a user among combinations of the shipping quantity and the prices displayed by the display unit as decided matter and registers it as the shipping quantity/price plan.

With the shipping planning system according to the present invention, a shipment plan for increasing profit can be made by evaluating profit increase for each product based on the relationship between the price and the shipping quantity, available amount of resource and additional variable cost with additional procurement.

Other objects, features and advantages of the invention will become apparent from the following description of the embodiments of the invention taken in conjunction with the accompanying drawings.

BRIEF DESCRIPTION OF THE DRAWINGS

FIG. 4 is a diagram showing an example of a resource configuration master corresponding to each product of FIG. 2;

FIG. 5 is a diagram showing a data structure of the resource master;

FIG. 6 is a diagram showing data structures of material inventory data and material storage planning data;

FIG. 7 is a diagram showing an example of data structures of the production capacity data;

FIG. 9 shows the available shipping quantity of the product A calculated by the calculating unit of the available shipping quantity for each product 102 and the additionally procured amount of resource;

FIG. 10 shows the available shipping quantity of the product B calculated by the calculating unit of the available shipping quantity for each product 102 and the additional procured amount of resource;

FIG. 11 shows the available shipping quantity of the product C calculated by the calculating unit of the available shipping quantity for each product 102 and the additional procured amount of resource;

FIG. 12 is a diagram showing an example of an additional variable cost according to the shipping quantity of the product A calculated by the calculating unit of the additional variable cost for the shipping quantity 103;

FIG. 13 is a diagram showing an example of the additional variable cost according to the shipping quantity of the product B calculated by the calculating unit of the additional variable cost for the shipping quantity 103;

FIG. 14 is a diagram showing an example of the additional variable cost according to the shipping quantity of the product C calculated by the calculating unit of the additional variable cost for the shipping quantity 103;

FIG. 23 is a diagram showing an example displaying a combination of the shipping quantity and the prices for which relative profit for other products is the maximum for each product;

FIG. 24 is a diagram showing an example of data structures of updated material inventory data and material storage planning data;

FIG. 25 is a diagram showing an example of data structures of the updated production capacity data;

FIG. 26 is a diagram showing an example of the result of planning of the shipping quantity/price;

DETAILED DESCRIPTION OF THE EMBODIMENTS

An example of the shipping planning system of the present invention will be described below in detail with reference to the drawings. In the embodiment of the present invention, an example is given of a system that can decide the price and the shipping quantity for each product so as to increase profit in a predetermined period in a business for producing and selling a large amount of products such as household electrical appliances, computers, clothes or the like.

Figure 1:
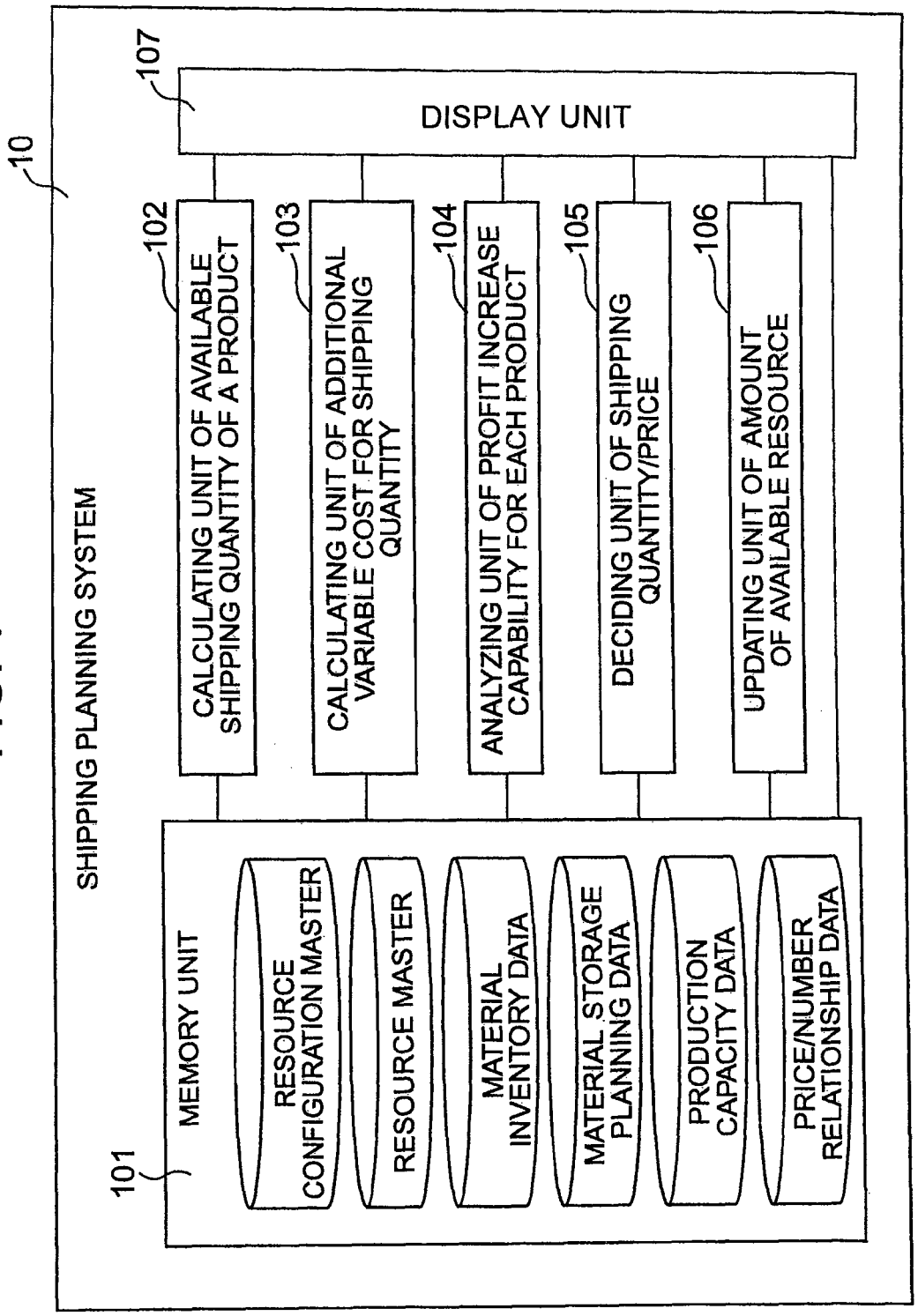
FIG. 1 is a diagram showing a configuration of unit of a shipping planning system of the present invention.

FIG. 1 shows an example of a configuration of a unit of the present system. A shipping planning system 10 includes:

a memory unit 101 for storing a resource configuration master in which a configuration of a resource such as materials or facilities used in producing products is registered, a resource master in which a procurement lead time that is a period required for a new procurement of the resource and a procurement cost, material inventory data representing the amount of inventory of the materials, material storage planning data representing the planned amount of the materials to be stored, production capacity data representing the production capacity of the facilities or the like, and price/number relationship data that represents the relationship between the price of each product and the shipping quantity, and the like;

a calculating unit of the available shipping quantity for each product 102 for calculating the available shipping quantity and the amount of additional procured resource for each product by using the resource configuration master based on the amount of inventory available for each material registered in the material inventory data, the amount of planned storage available for each product registered in the material storage planning data, procurement lead time for each material registered in the resource master, and available capacity registered in the production capacity data;

a calculating unit of the additional variable cost for the shipping quantity 103 for calculating additional variable cost according to the shipping quantity for each product based on the available shipping quantity and the additional amount of resource to be procured, calculated by the calculating unit of the shipping quantity for each product 102 and the resource procurement cost registered in the resource master;

an analyzing unit of profit increase capability for each product 104 for calculating a difference between marginal profit obtained by shipment of a certain product and marginal profit of another product that cannot be obtained by the production of the product as a relative profit by using an additional variable cost, the price/number relationship data and the resource configuration master for each shipping quantity calculated by the calculating unit of the additional variable cost for the shipping quantity 103 and being able to analyze the profit increase that is predicted by the shipment of the product;

a deciding unit of the shipping quantity/price 105 for deciding the shipping quantity and the price of the products whose relative profit becomes positive; and an updating unit of the amount of available resource 106 for calculating the amount of materials and the production capacity required for meeting the shipping quantity by using the resource configuration master, the resource master, material inventory data, material storage planning data and production capacity data for the shipping quantity decided by the deciding unit of the shipping quantity/price 105, updating the amount of inventory available for the material, the amount of storage planned products available and available capacity, and registering them in the material inventory data, the material storage planning data and the production capacity data. The shipping planning system also includes a display unit 107 for enabling a user to decide by displaying the progress of the processing, data to be used, the shipping quantity, options in deciding a price and the like.

With the above-mentioned configuration, the additional variable cost according to the available shipping quantity and the shipping quantity for each product can be obtained by the processing of the calculating unit of the available shipping quantity for each product 102 and the calculating unit of the additional variable cost for the shipping quantity 103. With the obtained additional variable cost, the analyzing unit of profit increase capability for each product 104 can calculate the relative profit with only simple calculation with the shipping quantity for each product being an operational variable. Then, the deciding unit of the shipping quantity/price 105 can plan the shipment for increasing the profits by selecting the shipping quantity and the price with which the relative profit becomes positive.

Figure 2:
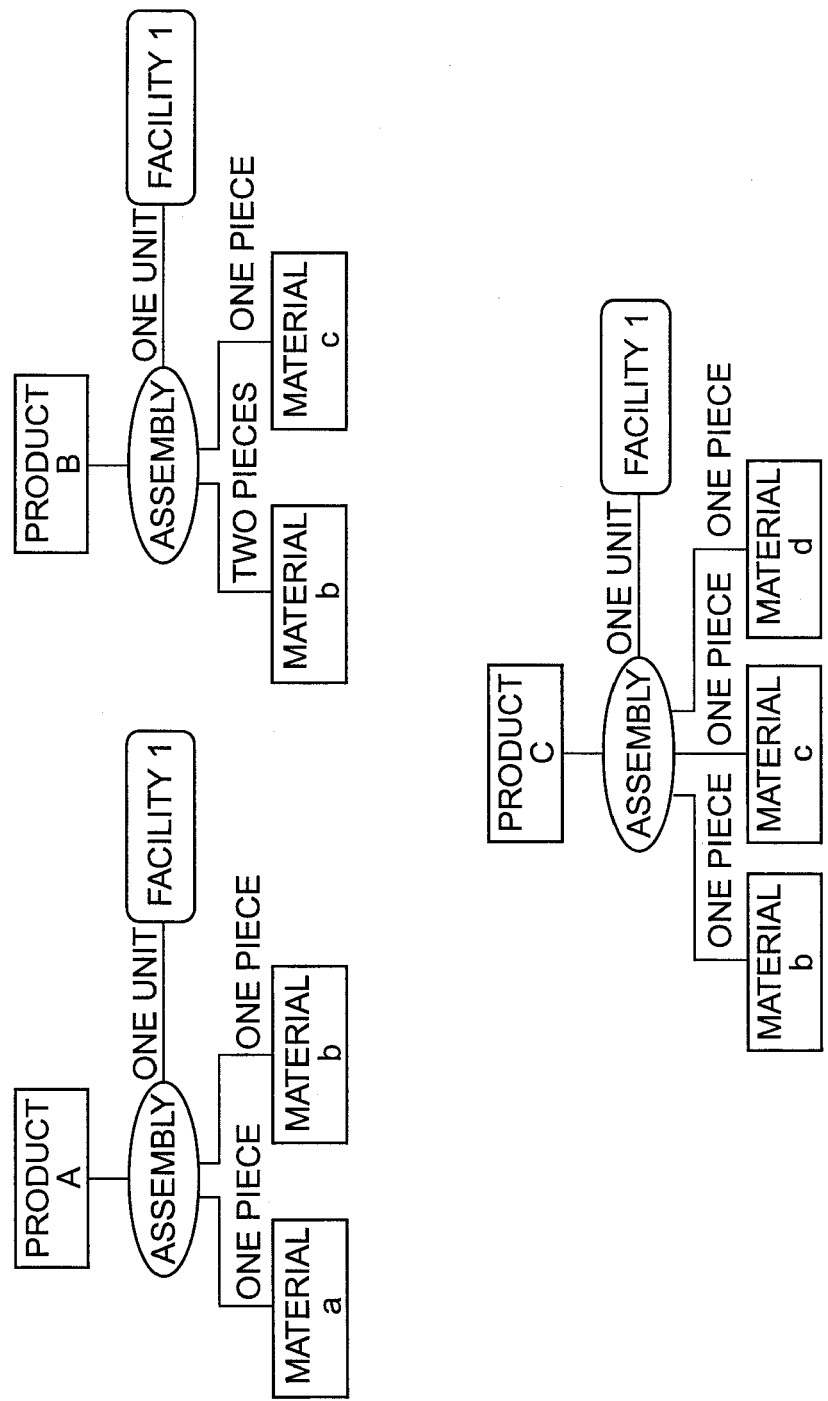
FIG. 2 is a diagram showing a configuration of three types of the product used in an example of the present invention.

It is assumed for three products as shown in FIG. 2 that a price and the shipping quantity are decided in consideration of the relationship between the price and demand, restriction on the available amount of resources such as materials and production capacity in the present embodiment. In FIG. 2, the product A is produced by assembling a material "a" and a material "b" using a facility 1. In that producing process, the capacity of the facility 1 is consumed by 1 unit. The unit of consuming the capacity may be represented by an operation time of the facility or the through put such as the processed number. Similarly, the product B is produced by assembling two materials "b" and a material "c" using the facility 1. The product C is produced by assembling a material "b", a material "c" and a material "d" using the facility 1. As such, the product A and the product B share the material "b", the product B and the product C share the materials "b" and "c", and the product C and the product A share the material "b" and the facility 1 is needed for assembling all the products. Therefore, the above-mentioned shared resource relationship and the available amount for each resource need to be taken into consideration in deciding the shipping quantity for each product.

Now, operation of each unit which configures the shipping planning system shown in FIG. 1 will be described.

Figure 3:
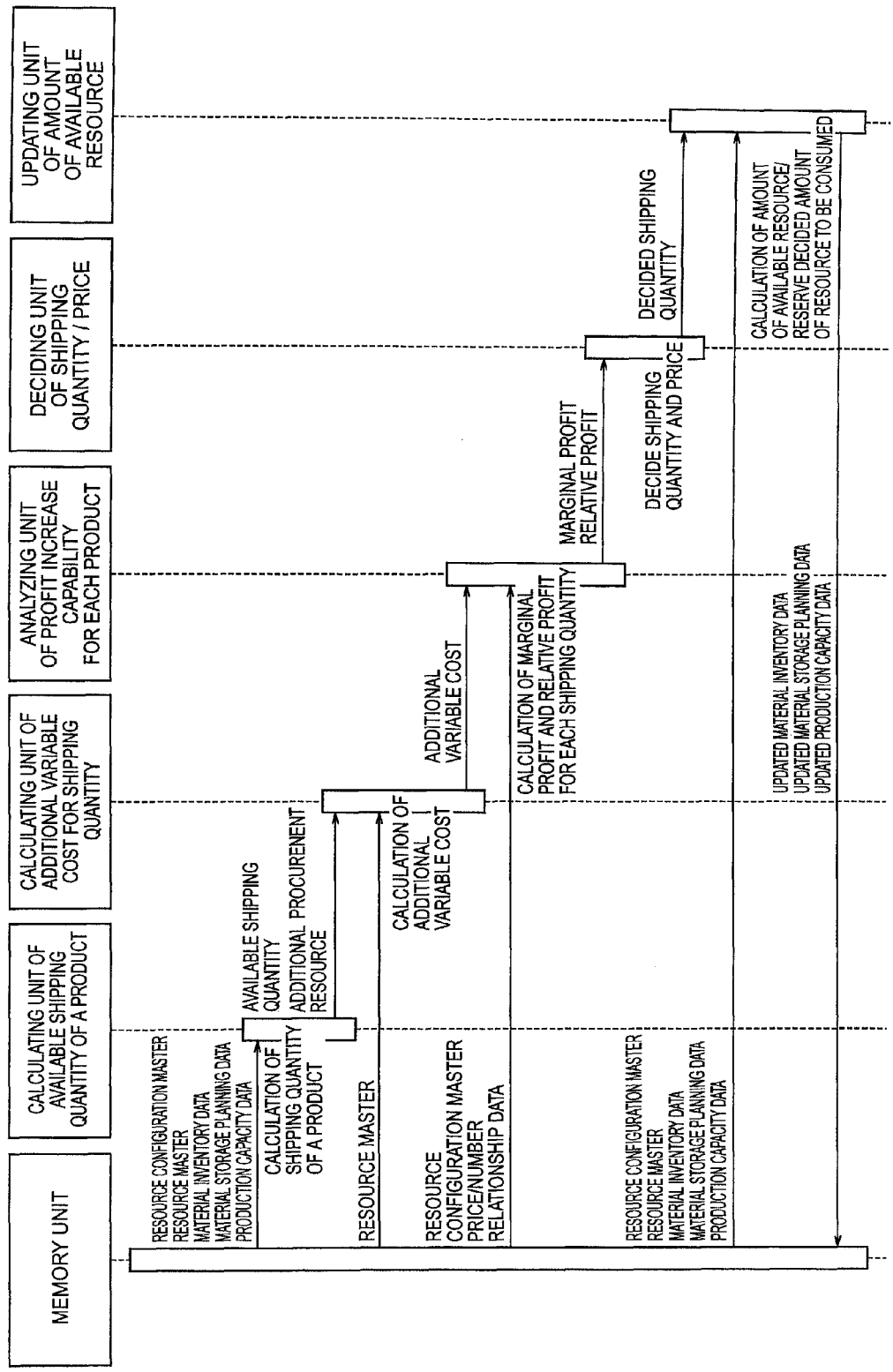
FIG. 3 is a sequence diagram showing an order of operations of each of the units of the shipping planning system of the present invention.

FIG. 3 is a sequence diagram showing an order of operations by each unit. First, the calculating unit of the available shipping quantity for each product 102 reads the resource configuration master, resource master, material inventory data, material storage planning data and production capacity data stored in the memory unit 101 and calculates the available shipping quantity and the amount of additional procured resource.

FIG. 4 shows an example of the resource configuration master corresponding to each product in FIG. 2. That example corresponds to a parts list or a production recipe that are generally used in the production planning approach such as the MRP. In the master, processes for producing each product, and resources and required amounts for the processes are registered.

FIG. 5 shows an example of the resource master, in which procurement lead time and the procurement cost for each resource are registered. The lead time is a period that is required for newly procuring the resource. The amount of resource planned to be stored in the period has been predetermined based on the past order, and that cannot be changed. For example, the procurement lead time of the material "a" is three weeks. That is to say, if the material "a" is newly ordered now, it will be stored after the time point when three weeks will have elapsed (i.e., after four weeks or later). On the other hand, the amount of the material "a" planned to be stored in three weeks from now is predetermined based on the amount of past orders, and cannot be changed. With such an procurement lead time, the available amount of the resource for the time being is limited.

FIG. 6 shows an example of material inventory data and material storage planning data, also indicating the accumulative available amount to be calculated for each week thereafter. For example, there are 80 material "a" at the present time, and 80 materials are planned to be stored for each week for the three weeks thereafter. Therefore, the accumulative available amount can be calculated that it will be 160 by the end of the first week, 240 by the end of the second week, and 320 by the end of the third week. The accumulative available amounts need not be explicitly calculated nor stored as data, though, they are shown as such for convenience of description of the embodiment.

FIG. 7 shows an example of production capacity data. The production capacity represents the amount available to be processed for each week.

Based on the above-mentioned master and data, the calculating unit of the available shipping quantity for each product 102 can calculate the available shipping quantity for each week for each product. Here, the number of a certain product available to be shipped unit calculates the maximal available shipping quantity by using available resources, assuming that only that product is produced. For the procedure for calculating the available shipping quantity of the products based on the amount of the resource available, an algorithm of the general MRP or a production scheduling can be used.

Figure 8:
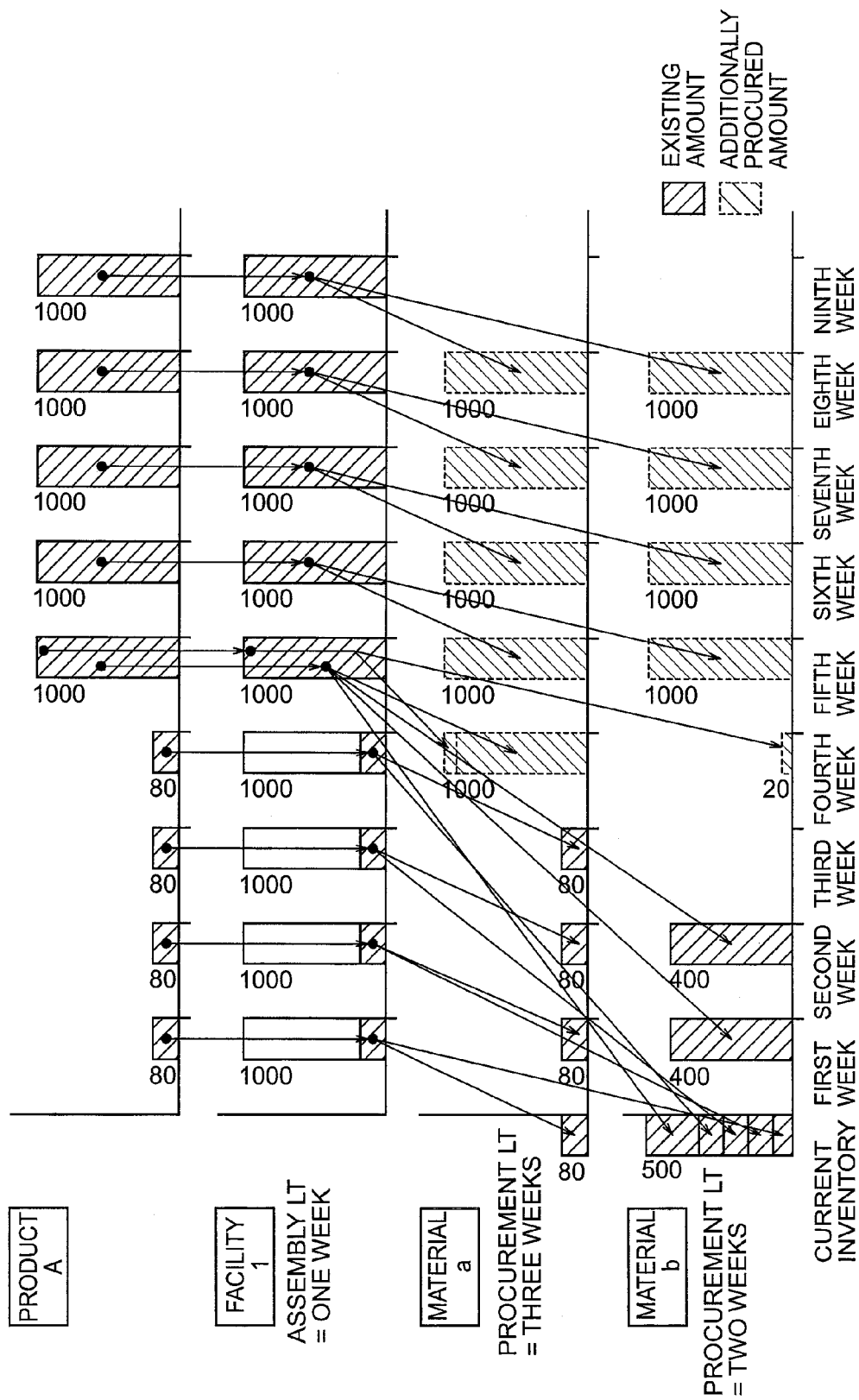
FIG. 8 is a diagram illustrating calculation logic by a calculating unit of the available shipping quantity for each product 102.

FIG. 8 shows an example of the calculation logic of the calculating unit of the available shipping quantity for each product 102. For example, in order to calculate the available shipping quantity of the product A for the first week, the capacity of the facility 1 according to the shipping quantity, calculating a required amount and a required time point for the material "a" and the material "b" with backward development by increasing the shipping quantity for the first week, and the maximum shipping quantity that does not exceed the accumulated available amount until the required time point for each resource (the facility 1 is for the first week, the material "a" and the material "b" are for the 0-th week=present) only need to be obtained. The available shipping quantity of the product A for the first week is calculated as the maximal 80 using 80 units of the capacity for the first week of the facility 1 and 80 of the present inventory of the material "a" and 80 of the present inventory of the material "b". The shipping quantity for the second week and after is also calculated by incrementing the shipping quantity by one, with backward development by using the remaining available amount other than the resources used for the shipment before that point of time. Among the resources required for producing the product A, available amount of the material "a" up to the third week is little, which is a procurement lead time, and the material "a" cannot be newly procured. That is a bottleneck. Thus, the shipping quantity up to the fourth week is limited by the number of the material "a" to be 80 for each week. For shipment for the fifth week, the required number of the material "a" can be newly procured according to the shipping quantity. The available amount of the material "b" left unused till the fourth week is 980. If the shipping quantity is to exceed that available number, the material "b" needs to be newly procured. On the other hand, as the capacity of the facility 1 for the fifth week is 1000 units, it can accommodate the shipment of the product A up to 1000. That is to say, if the shipping quantity of product A in the fifth week can be achieved up to 980 by additionally acquiring the material "a" by 980, it can accommodate the shipment of the product A up to 1000 by additionally acquiring the material "a" by 20 and also the material "b" by 20. The shipment of the products exceeding 1000 is impossible because that exceeds the capacity of the facility 1. Therefore, the available shipping quantity of product A for the fifth week is calculated as 980 with the additional acquirement of the material "a", and calculated as 1000 with the additional acquirement of the material "a" and the material "b". The shipping quantity and the amount of additionally procured resource are calculated also for the sixth week and after. The shipping quantity and the amount of additionally procured resource for the product B and the product C are similarly calculated for each week.

FIGS. 9 to 11 show the shipping quantity and the additional resource to be procured calculated by the calculating unit of the available shipping quantity for each product 102. For example, FIG. 9 shows that the product A can be accumulatively shipped by the number of 320 without additionally procured resources up to the fourth week, it can be accumulatively shipped by the number of 1300 by additionally acquiring the material "a" by the number of 980, and it can further be accumulatively shipped by the number of 1320 by additionally acquiring the material "a" by the number of 20 and the material "b" by the number of 20 up to the fifth week.

Next, the calculating unit of the additional variable cost for the shipping quantity 103 calculates the additional variable cost according to the shipping quantity for each product by using the procurement cost for each resource of the resource master based on the available shipping quantity and the additionally procured resource calculated by the calculating unit of the available shipping quantity for each product 102.

FIGS. 12 to 14 show examples of the additional variable cost according to the shipping quantity for each product calculated by the calculating unit of the additional variable cost for the shipping quantity 103. FIG. 12, for example, shows that it costs 80 yen as the additional variable cost in order to ship the product A by the number of 322.

Figure 15:
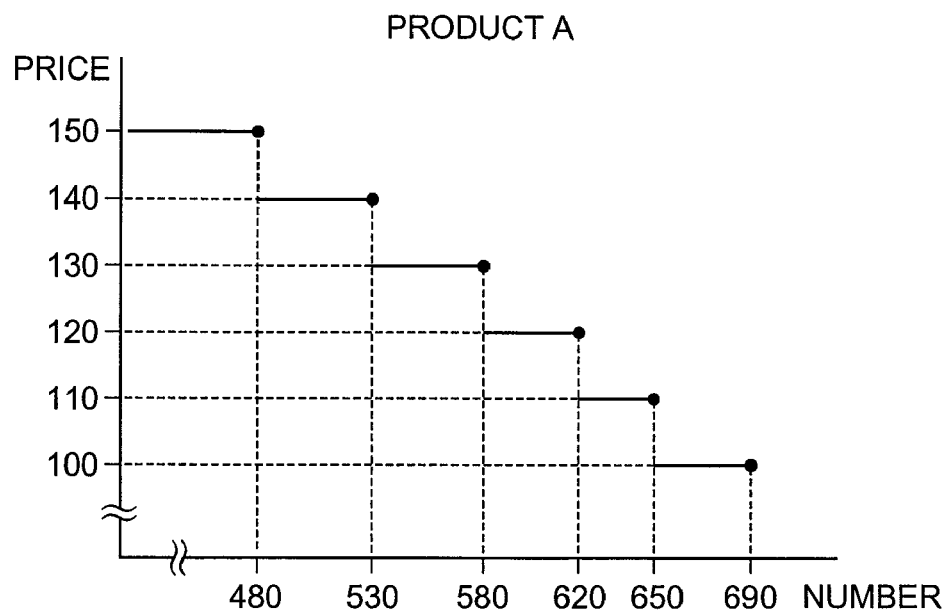
FIG. 15 is a diagram showing an example of the relationship between price/number data representing the relationship between the price and the shipping quantity of the product A.
Figure 16:
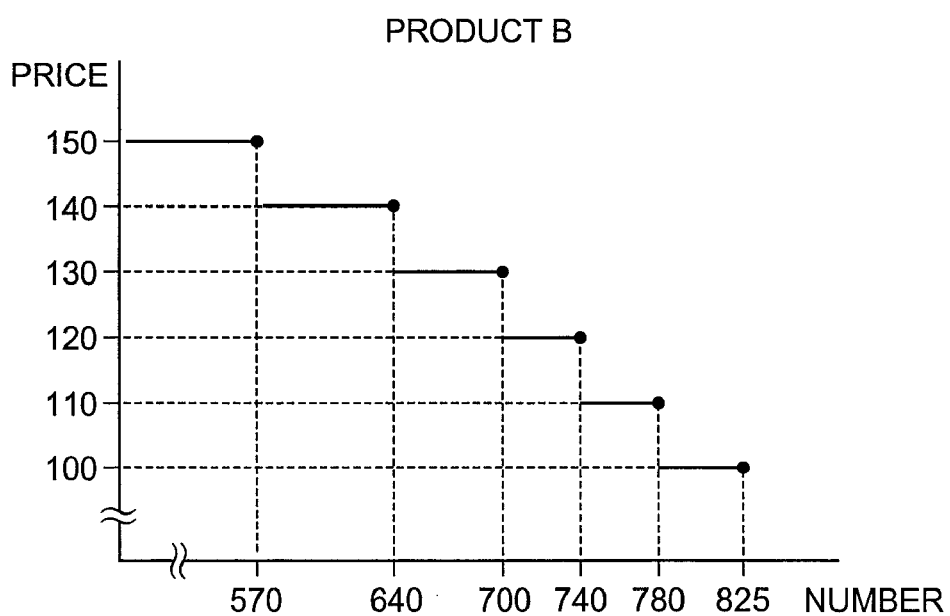
FIG. 16 is a diagram showing an example of the relationship between price/number data representing the relationship between the price and the shipping quantity of the product B.
Figures 17, 18:
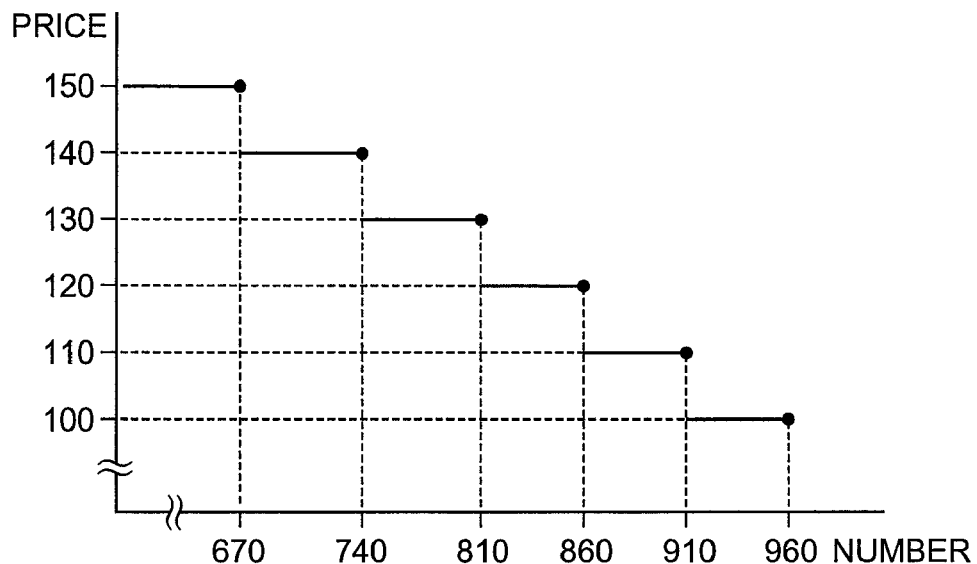
FIG. 17 is a diagram showing an example of the relationship between price/number data representing the relationship between the price and the shipping quantity of the product C.
FIG. 18 is a diagram showing an example of the resource sharing relationship matrix.

On the other hand, FIGS. 15 to 17 show examples of price/number relationship data representing the relationship between the price and the shipping quantity for each product. The relationship between the price and the number may be represented by a continuous curve or a functional relation, or may be represented by the discrete relationship shown in the figure, with the general characteristic of the price monotonously decreasing as the number increases. Actually, both the upper limit and the lower limit of the price that can be set for each product have been decided, and it is not practical to continuously adjust the price even between the upper limit and the lower limit. Therefore, it is common to decide the price as the representative round number. By setting the lower limit of the price, the maximal value of the shipping quantity is decided. Therefore, the price/number relationship data in the form as shown in the figure is more practical. For example, in FIG. 15, the price of the product A is set by 10 yen between 100 yen and 150 yen and the width of the shipping quantity has been decided according to each price. The shipping quantity (=the number of the products to sell) is up to 690 when the price is set to 100 yen. In order to sell the products by more than that number, the price needs to be set lower, but 100 yen is the lower limit for the price. Therefore, it means that selling more than 691 is not considered. The maximal number corresponding to the lower limit for the price is called the maximal shipping quantity. It is apparent from the FIGS. 15-17 that the maximal number of the product A to be shipped is 690, that of the product B is 825, and that of the product C is 960.

Figure 28:
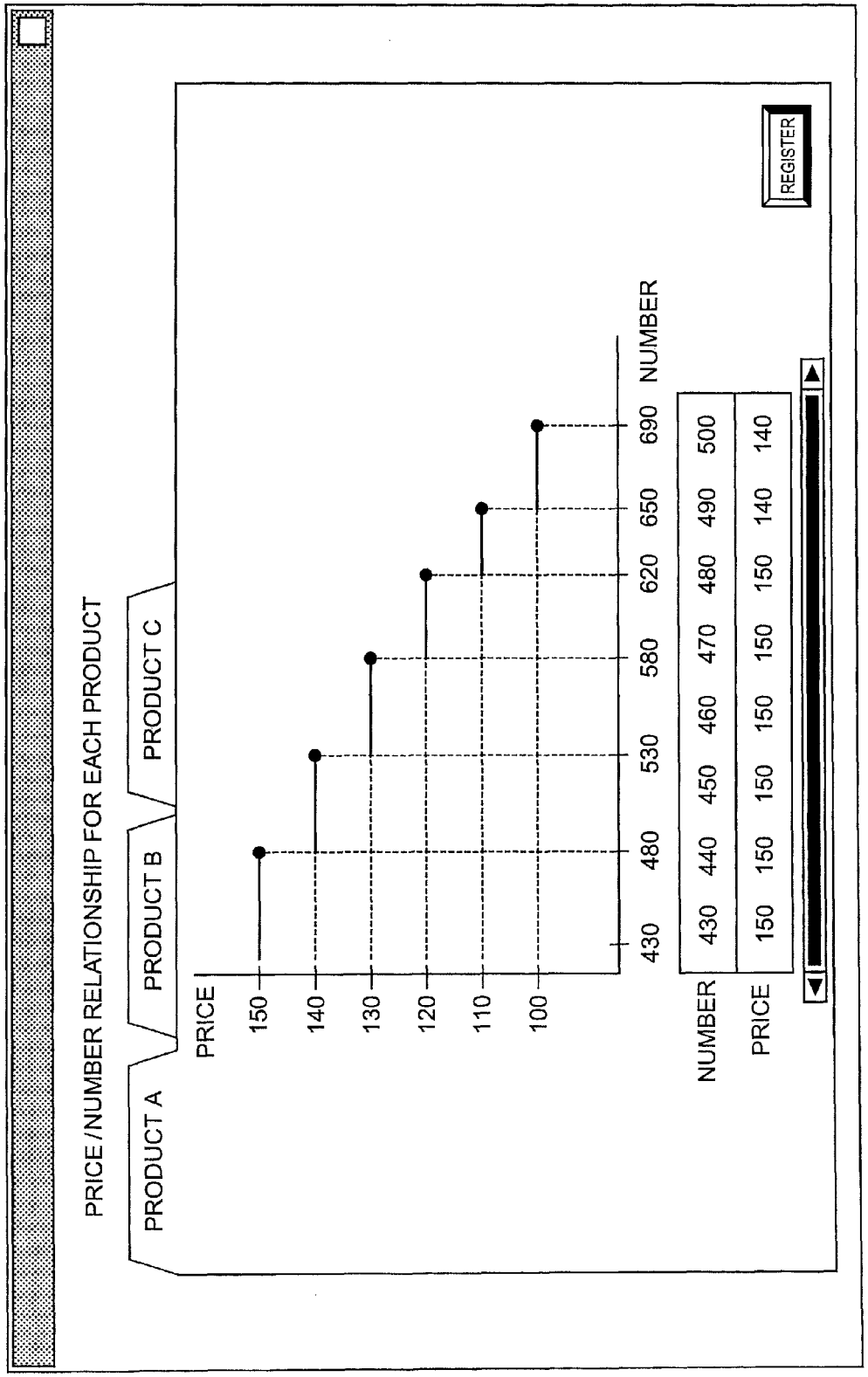
FIG. 28 is a diagram showing an example of an input interface screen for registering the data on the relationship between price for each product/number of the product.

As the number meeting the relationship by which the price monotonously decreases as the number increases on the corresponding input table of the number and the price is input as shown in FIG. 28, for example, for registration of the price/number relationship data, an input interface for displaying a graph corresponding to the number is provided on the screen. After a series of data is input, the registration button is manipulated to register the price/number relationship data for each product.

With the additional variable cost according to the shipping quantity shown in FIGS. 12 to 14 and the price/number relationship data shown in FIGS. 15 to 17, the profit increase capability can be known for each product for the reasons to be mentioned below.

As fundamental characteristics, the additional fluctuation price monotonously increases as the shipping quantity increases, and the price monotonously decreases as the shipping quantity increases. Thus, the marginal profit for each product is not monotonous against the shipping quantity, but the shipping quantity for maximizing the marginal profit can be selected. Here, the range for the shipping quantity that can be adjusted for each product is decided with the lesser number as the upper limit of either the shipping quantity calculated by the calculating unit of the shipping quantity 102 or the maximal shipping quantity decided according to the price/number relationship data. As the price can be induced from the shipping quantity based on the price/number relationship data, the marginal profit can be calculated for each product in the range of the shipping quantity that can be adjusted for each product.

On the other hand, as resources are shared between products, a product sometimes cannot be produced when another product that shares the resource with the first product is produced. Then, the number of a product that cannot be shipped at the same time needs to be obtained based on the number of a certain product to be shipped and the marginal profit that should have been obtained if the first product was shipped needs to be considered as the Opportunity Loss. Therefore, the substantial range of profit increase as a certain product is shipped should be evaluated by the relative profit that is the marginal profit of the product subtracted by the Opportunity Loss by the other product that shares the resource. It can be considered that a plurality of other products cannot be shipped as the product is shipped. In such a case, the product with the least relative profit among them will be focused upon.

Based on the above-mentioned reasoning, the analyzing unit of profit increase capability for each product 104 calculates the relative profit for each product by the processes below and enables the determination of the profit increase capability. First, the marginal profit according to the shipping quantity for each product is calculated from the additional variable cost of FIGS. 12 to 14 and the price×the number−additional variable cost from the price/number relationship data shown in FIGS. 15 to 17. For example, as the additional variable cost is 10400 yen when the number of the product A to be shipped is 580 from FIG. 12 and its price is 130 yen from FIG. 15, the marginal profit is calculated as (130×580)−10400=65000 yen.

Next, a resource sharing relationship matrix as shown in FIG. 18 is prepared to calculate the number of the other products that cannot be shipped when a certain product is shipped. The resource sharing relationship matrix represents how many of the products arranged on the horizontal axis cannot be produced when one product arranged on the vertical axis is produced. The matrix can be obtained from the ratio of required amounts of the shared resources between products that share the resources based on the resource configuration master. The value of the resources for which the ratio becomes the maximum is used between the products that share a plurality of resources. If one piece of product A is produced, one piece of product B that shares the material "b" and the facility 1 cannot be produced (=max {1/2(material "b"), 1/1(facility 1)}). The value will be called a shipment affection coefficient from the product A to the product B. With this resource sharing relationship matrix, the number of the other product that shares the resource that cannot be shipped for the shipping quantity of a certain product can be obtained by multiplying the shipping quantity by the shipment affection coefficient from the product to the other product that shares the resources. For example, the number of the product B not able to be shipped when the number of the product A is 580 can be obtained as 580×1.0=580. The value will be called the number of shipment affection from the product A to the product B. Here, as the number of shipment affection from the product A to the product B may be bigger than the available shipping quantity of the product B calculated by the calculating unit of the available shipping quantity for each product 102 or the maximal number of the product B decided based on the price/number relationship data, the Opportunity Loss does not occur to all the number of the shipment affection. Therefore, the Opportunity Loss of the product B due to the shipment of the product A needs to be calculated based on the price and the additional variable cost according to the least among the number of shipment affection from the product A to the product B, the number of the product B available to be shipped, and the maximal number of the product B to be shipped. For example, as the number of shipment affection to the product B is 580 when the shipping quantity of the product A is 580 and the maximal number of the product B is 825, the Opportunity Loss (=the marginal profit by the product B) is obtained as (140×580)−0=81200 yen by using the price 140 yen when the shipping quantity of the product B is 580 and the additional variable cost 0 yen. On the other hand, the number of shipment affection to the product A is 580×2.0=1160 when the number of the product B to be shipped is 580 but the maximal number of the product A is 690, thus the Opportunity Loss (=the marginal profit by the product A) is obtained as (100×690)−14800=54200 yen by using the price of 100 yen when the shipping quantity of the product A is 690 and the additional variable cost is 14800 yen.

With the above-mentioned processing, the marginal profit according to the shipping quantity and the Opportunity Loss by the product sharing the resource with the first product are obtained, and the relative profit according to the shipping quantity is obtained. For example, the relative profit for the product B is in the red such as 65000 (the marginal profit of the product A)−81200 (the Opportunity Loss by the product B)=−16200 yen when the shipping quantity of the product A is 580. It is apparent that it is not beneficial to ship the product A by the number of 580. On the other hand, the relative profit for the product A is in the black such as 81200 (the marginal profit of the product B)−54200(the Opportunity Loss by the product A)=27000 yen when the shipping quantity of the product B is 580. It is apparent that profit may increase if the product B is shipped by the number of 580.

Figure 19:
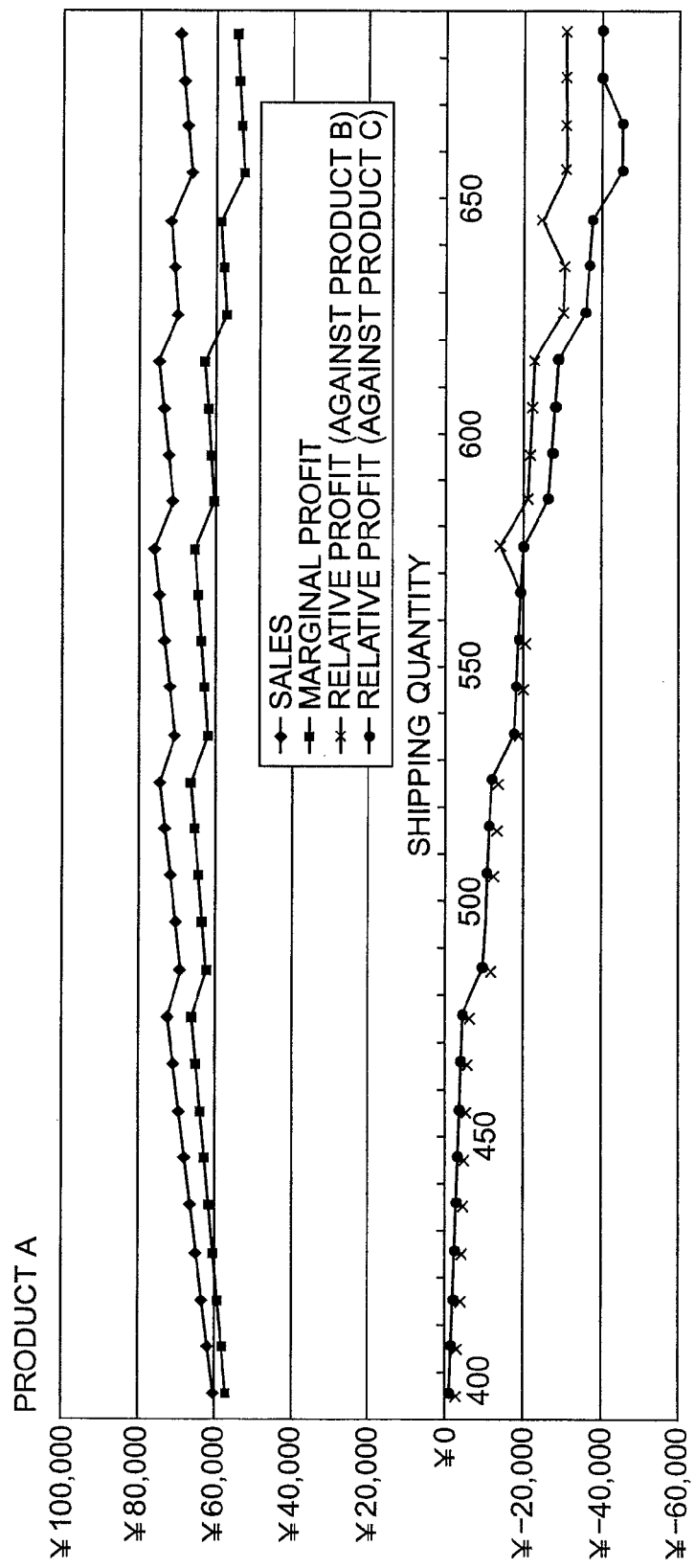
FIG. 19 is a diagram showing a graph plotting relative profit for the product B and the product C according to the shipping quantity of the product A.
Figure 20:
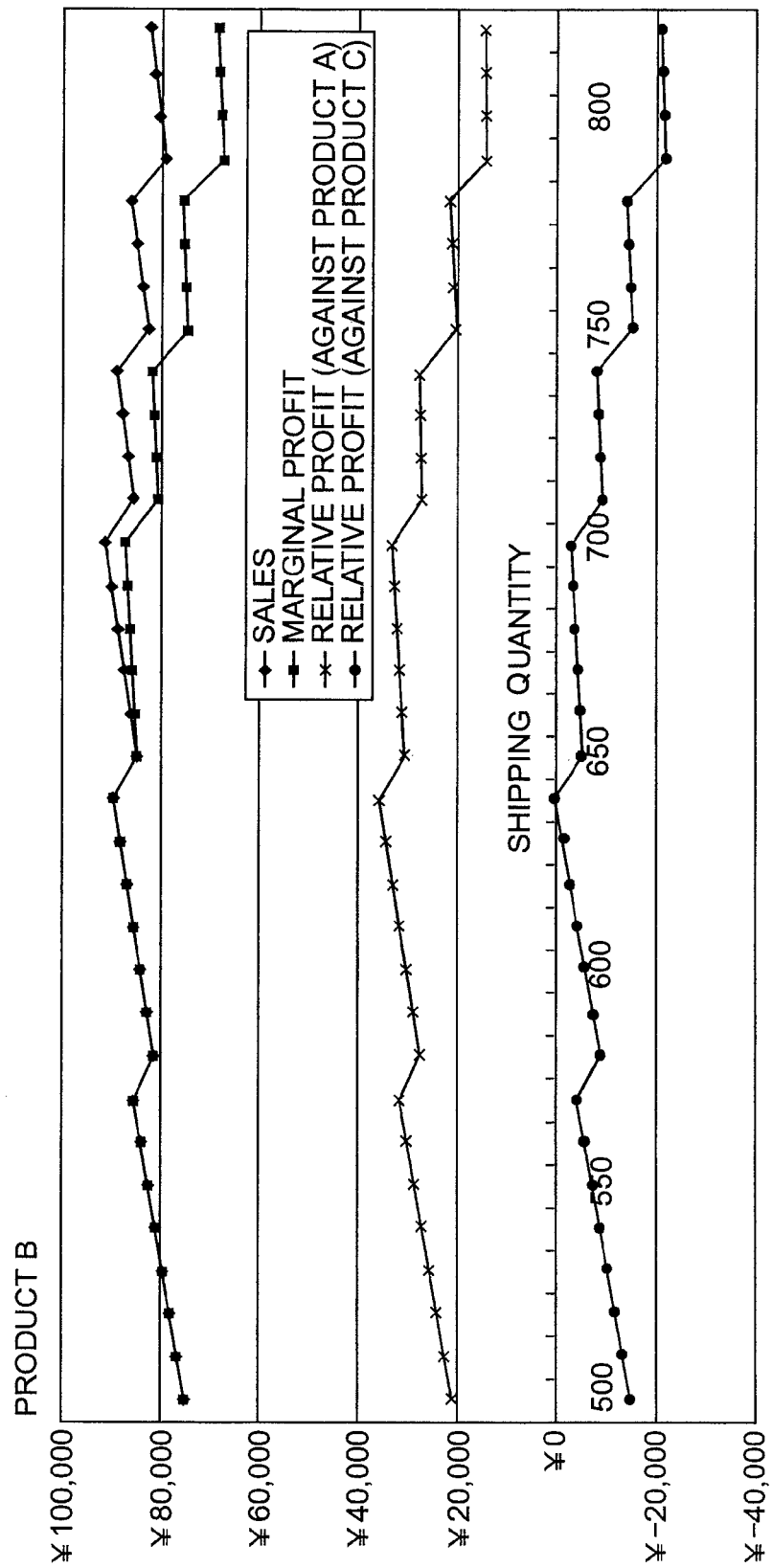
FIG. 20 is a diagram showing a graph plotting relative profit for the product A and the product C according to the shipping quantity of the product B.
Figure 21:
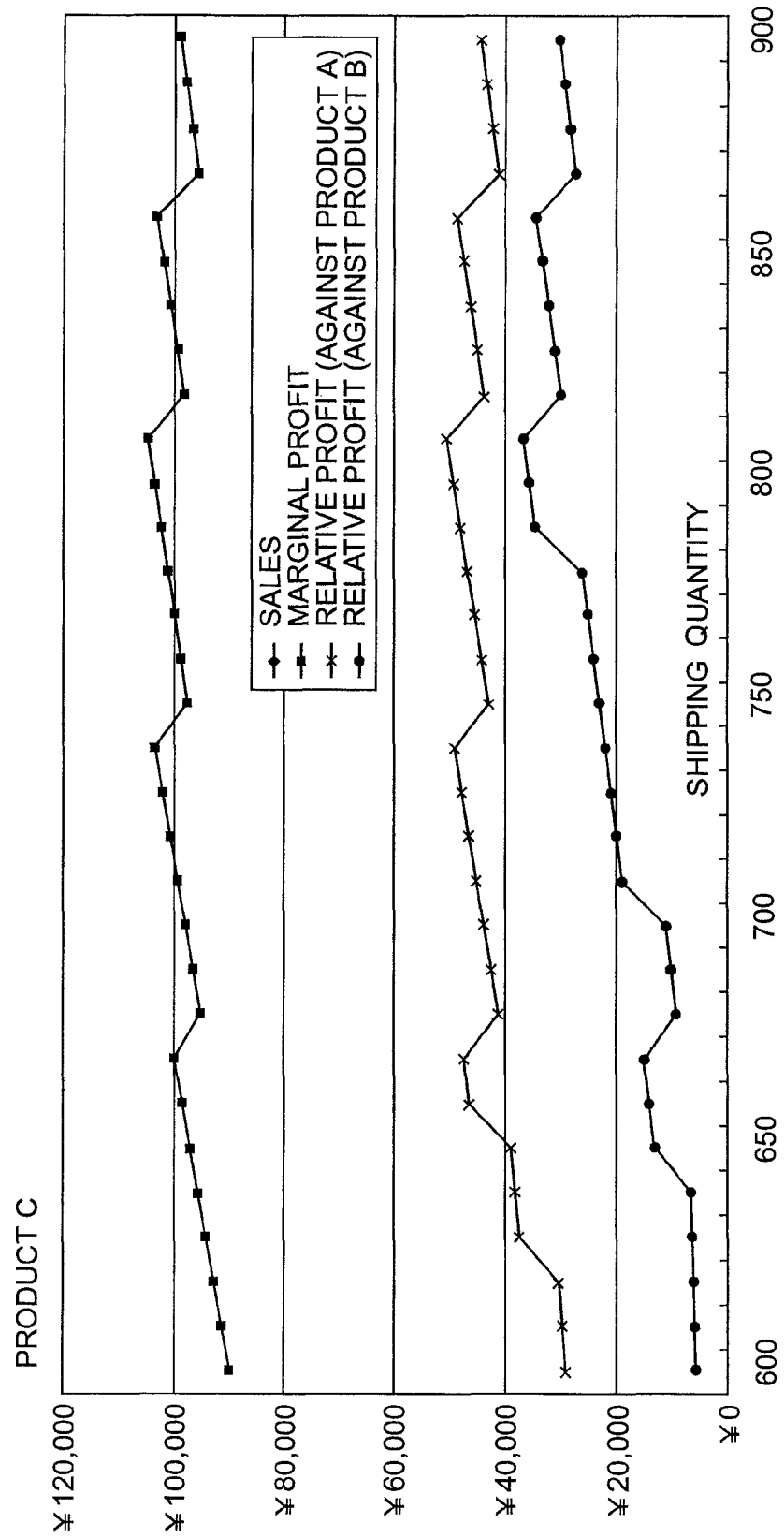
FIG. 21 is a diagram showing a graph plotting relative profit for the product A and the product B according to the shipping quantity of the product C.

The analyzing unit of profit increase capability for each product 104 calculates the relative profit as mentioned above for each combination of any two products. FIG. 19 shows a graph plotting the relative profit for the product B and the product C according to the shipping quantity of the product A; and FIG. 20 shows a graph plotting the relative profit for the product A and the product C according to the shipping quantity of the product B; and FIG. 21 shows a graph plotting the relative profit for the product A and the product B according to the shipping quantity of the product C. If the relative profit is in the red, it is shown that the profit may increase if the other product is shipped in preference to the first product. If the relative profits to all the other products are in the black, it can be understood that the lowest relative profit is the practical range of profit increase obtained by shipment of the product. Therefore, the most profit increase capability can occur with certain product if the shipping quantity is set as the shipping quantity by which the least value among the relative profits for the other products (it is called as the minimum relative profit) becomes maximal. The price in that case is decided from the price/number relationship data. As mentioned above, if the minimum relative profit is in the red, it means that there will be no opportunity for increased profit with the product.

Next, the deciding unit of the shipping quantity/price 105 decides the appropriate shipping quantity and the price based on the relative profit calculated by the analyzing unit of profit increase capability for each product 104. As the relative profit calculated by the analyzing unit of profit increase capability for each product 104 is calculated independently for each product based on the available amount of the present resource (assuming that no other products are produced), there is only one product whose shipping quantity and price are decided based on information on the relative profit. That is to say, if a certain product is selected and the shipping quantity and the price are decided, and the available amount of the resource changes, accordingly the relative profit needs to be calculated again under a new available amount of the resource. Therefore, the shipping quantity and the price are decided by selecting one product from the products whose shipping quantity and whose price have not been decided in a single process by the deciding unit of the shipping quantity/price 105.

If selection of the products and decision of the shipping quantity and the price are automatically performed by the deciding unit of the shipping quantity/price 105, the maximal values of the least relative profits of respective products are compared with each other and only the product with the maximum value may be selected. For example, the least relative profit of the product A can be known by the curve of the relative profit to the product C in FIG. 19, but it is not in the black for any of the shipping quantity, thus, there is no possibility to increase profit with the product A. Also for the product B, as the least relative profit is represented by the curve of the relative profit to the product C in FIG. 20, and it is also in the red, the profit may not increase with product B. On the other hand, for the product C, the least relative profit is represented by the curve of the relative profit to the product B in FIG. 21, and the maximal value is 371000 yen. As the result, the deciding unit of the shipping quantity/price 105 selects the product C and the shipping quantity is decided as 810 (the shipping quantity whose relative profit=37100) and the price is decided as 130 yen based on the price/number relationship data in FIG. 17. The data is registered as the shipping quantity/price planning data.

Figure 22:
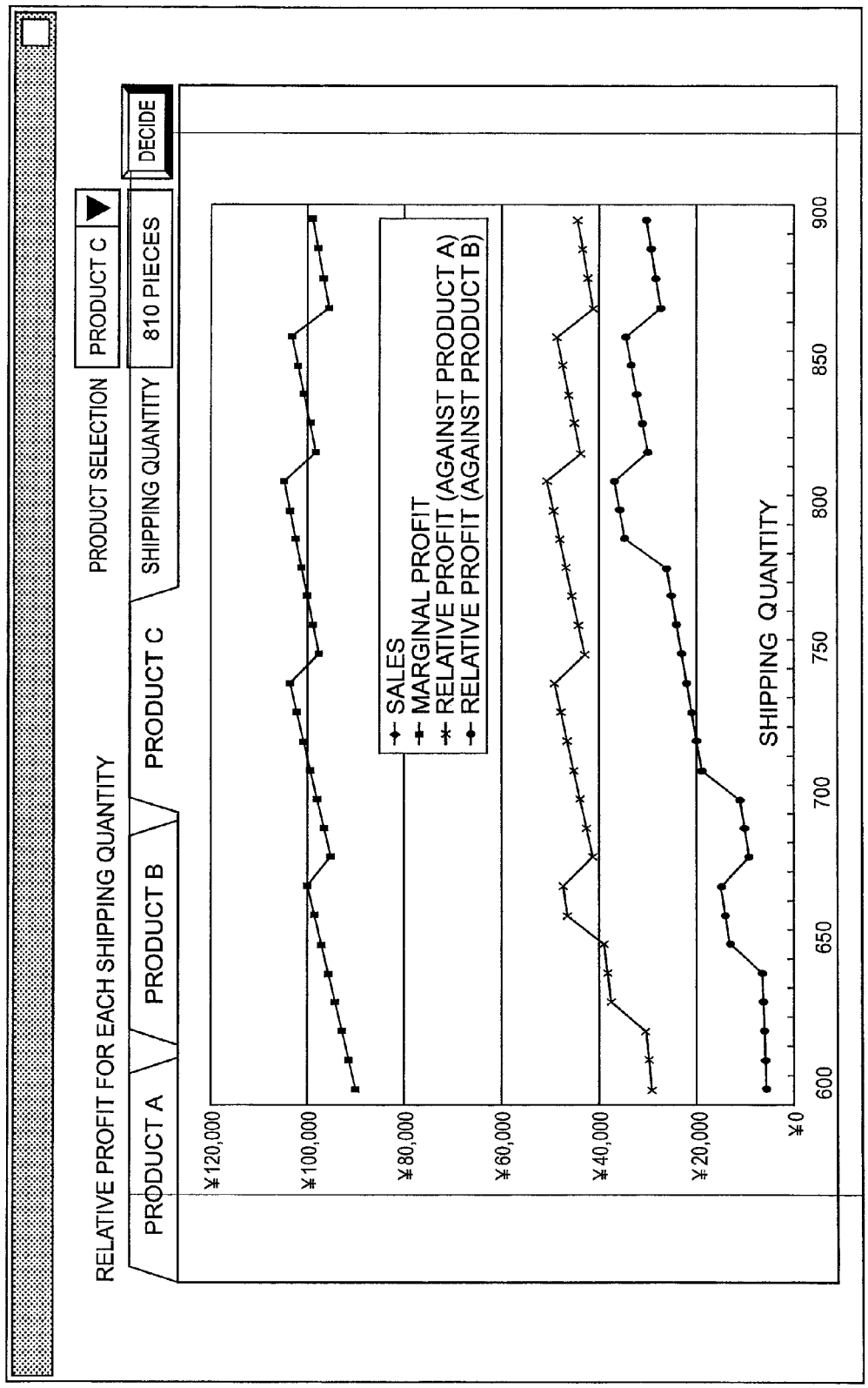
FIG. 22 is a diagram showing an example representing marginal profit and the relative profit for other products according to the shipping quantity displayed on a screen.

In some cases, it may be considered that a user is provided with information such as relative profit so that the shipping quantity and the price specified by the user is decided upon instead of the deciding unit of the shipping quantity/price 105 automatically selecting a product and deciding the shipping quantity and the price. In such a case, the display unit 107 only needs to be adapted to display the marginal profit according to the shipping quantity for each product and the relative profits for the other product on a screen as shown in FIG. 22 for a user to select a product by viewing the information and specify the shipping quantity. Alternatively, the display unit 107 may be adapted to automatically display a combination of the shipping quantity and the price by which the relative profit for the other product is the maximum for each product as shown in FIG. 23 for the user to select a combination among them. The deciding unit of the shipping quantity/price 105 receives the shipping quantity and the price that are set by the user by using the display unit 107 and registers them as the decided matters being the shipping quantity/price planning data.

As the number of a certain product to be shipped and the price are decided with the above-mentioned processing, the amount of the resources to be consumed is decided. Thus, in order to decide the shipping quantity and the price, the available amount of the resource needs to be calculated anew. The updating unit of the amount of available resource 106 updates the remaining available capacity by calculating the amount of the resource to be consumed with an algorithm such as the MRP or the production scheduling based on the shipping quantity decided by the deciding unit of the shipping quantity/price 105 and updating the material inventory data, the material storage planning data, and the production capacity data by subtracting the amount of the resource to be consumed from the data. For example, if the deciding unit of the shipping quantity/price 105 decides the shipping quantity of the product C as 810, inventory of the material "b" 500 and the material "b" planned to be stored in the first week 310, inventory of the material "c" 300, the material "c" planned to be stored in the first week 200, those to be stored in the second week 200 and those to be stored in the third week 110, and inventory of the material "d" 200 and the material "d" planned to be stored in the first week 100, those to be stored in the second week 200, those to be stored in the third week 100, those to be stored in the fourth week 200 and those to be stored in the fifth week 10 are consumed respectively by the same backward development as that shown in FIG. 8. For the production capacity, 200 units of the first week of the facility 1, 100 units of the second week, 200 units of the third week, 100 units of the fourth week, 200 units of the fifth week and 10 units of the sixth week are consumed. As a result, the material inventory data, the material storage planning data and the production capacity data are updated and the available capacities of the resource are those shown in FIGS. 24 and 25.

Hereinafter, the shipping quantity and the price are decided in order one by one by repeating the processing shown in the sequence diagram of FIG. 3 for the remaining products by using the newly updated material inventory data, material storage planning data and production capacity data. The above-mentioned processing is repeated until there is no product left that may finally increase profit. In the present embodiment, it is finally obtained as the shipping quantity/price planning result as shown in FIG. 26, for example.

Although information on the decision of the shipping quantity and the price as shown in FIG. 22 and FIG. 23 are exemplified as the contents to be displayed by the display unit 107 in the description above, information useful for a user at a step of each process of the shipping planning system 10 including the available amount of the resources in FIG. 6 or the available capacity in FIG. 7, the additional variable cost for each shipping quantity shown in FIG. 12 to FIG. 14, the price/number relationship data such as in FIG. 15 to FIG. 17, the resource sharing relationship matrix of FIG. 18, and the shipping quantity/price planning result of FIG. 26 may be displayed at any time as required.

Figure 27:
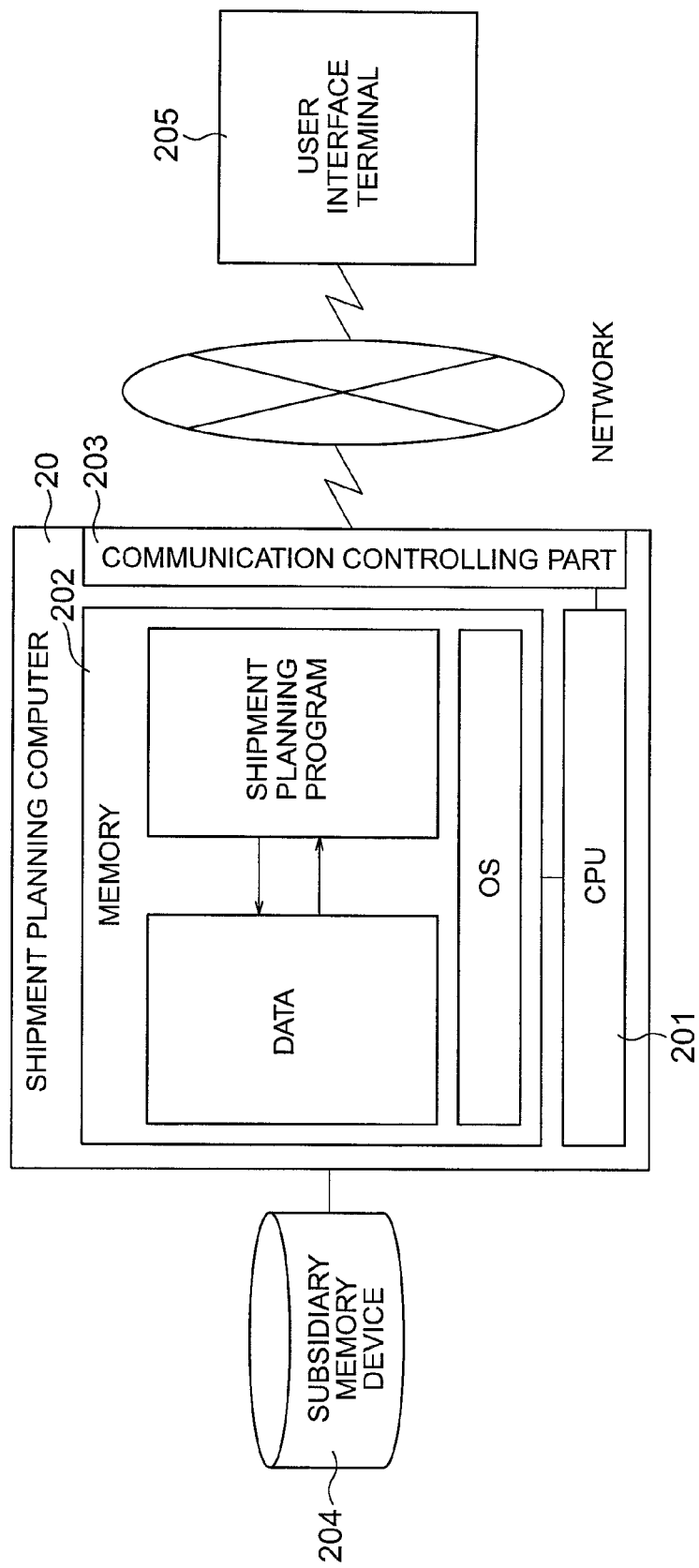
FIG. 27 is a diagram showing a hardware configuration of the shipping planning system of the present invention.

Finally, FIG. 27 shows an example of a hardware and software configuration for implementing the shipping planning system according to the present invention. The shipment planning computer 20 for implementing the shipping planning system 10 includes a CPU (a Central Processing Unit) 201 for performing various types of computation and instructions required for operations of the system, a memory 202 for storing an application program such as a shipment planning program describing the detailed operation of the shipment planning system and data required for the program, and a communication controlling part 203 for controlling connection and communication with the outside over a network as required. An operating system (OS), a program and data to be stored in the memory 202 can also be stored in a subsidiary memory device 204 by connecting the subsidiary memory device 204 to the shipment planning computer 20. Although a user interface for a user to manipulate the shipment planning system or input or output data can be included in the shipment planning computer 20, the user interface only needs to be adapted to communicate with the shipment planning computer 20 by placing a user interface terminal 205 outside the shipment planning computer 20 as shown in FIG. 27 and connecting it via a communication controlling part 203 and the network of the shipment planning computer 20 in order to enable a user to access the shipment planning computer 20 from a place physically distant from the shipment planning computer 20.

Each unit of the shipment planning system 10 shown in FIG. 1 corresponds to the components of FIG. 27 as follows in the above-mentioned hardware and software configuration.

While the function of the memory unit 101 is mainly implemented by the memory 202 when the other unit performs the processing, it is implemented by the subsidiary memory device 204 when a large amount of data is stored or fixedly stored.

Each function of the calculating unit of available shipping quantity for each product 102, the calculating unit of the additional variable cost for the shipping quantity 103, the analyzing unit of profit increase capability for each product 104, the deciding unit of the shipping quantity/price 105, the updating unit of the amount of available resource 106 and the display unit 107 is realized by interaction of the OS and the shipment planning program stored in the memory 202 and the CPU 201 for controlling them. At that time, various types of data stored in the memory 202 and the subsidiary memory device 204 are referenced or updated. When the calculating unit of the available shipping quantity for each product 102, the calculating unit of the additional variable cost for the shipping quantity 103, the analyzing unit of profit increase capability for each product 104, the deciding unit of the shipping quantity/price 105, the updating unit of the amount of available resource 106 and the display unit 107 need to communicate with the user interface terminal 205, the function is implemented by the communication controlling part 203.

It should be further understood by those skilled in the art that although the foregoing description has been made of embodiments of the invention, the invention is not limited thereto and various changes and modifications may be made without departing from the spirit of the invention and the scope of the appended claims.

The invention claimed is:
1. A shipping planning system for deciding a price and a shipping quantity of each of products which share a material resource and a facility resource for maximizing profit, comprising:
    a memory means for storing:
    (1) a resource configuration master in which data records having data items including at least processes for producing each product, said material resource and said facility resource required in the processes, and a required amount of the material resource and the facility resource are registered;

(2) a resource master in which a procurement lead time required for new procurement of said material resource and a procurement cost are registered;
(3) a material inventory data in which an inventory amount of said material is registered;
(4) a material storage planning data in which an amount of planned storage of said material is registered;
(5) a production capacity data in which a production capacity of said facility is registered; and
(6) a price/quantity relationship data in which a relationship between the price and the shipping quantity for each product are registered in advance, the price/quantity relationship satisfying a relation in which the price reduces as the shipping quantity increases with the price being between an upper limit and a lower limit;

a calculating means for calculating with backward development the available shipping quantity and an additional material resource procurement amount for each product registered in said resource configuration master for a time unit from a current time to a future time based on an amount of inventory available for each material registered in said material inventory data, an amount of planned storage available for each material registered in said inventory storage planning data, a procurement lead time for each material registered in said resource master, and available capacity of the facility registered in said production capacity data;

a calculating means for calculating additional variable cost corresponding to the shipping quantity for each product based on the available shipping quantity for a time unit, the additional procured amount of material resource calculated by said calculating means for calculating the available shipping quantity and the resource procurement cost registered in the resource master, and generating a data table of additional variable cost with respect to shipping quantity;

an analyzing means for performing, with respect to an arbitrary two products in all products, calculation of a relative profit for a shipping quantity of a specified product, which is a difference between a marginal profit obtained by shipment of said specified product and opportunity loss of another product that cannot be shipped by the production of the specified product by using the data table of the additional variable cost, said price/quantity relationship data and said resource configuration master; and a deciding means for selecting a product to be shipped, which makes the relative profits with respect to all other products positive, based on the relative profits calculated with respect to the arbitrary two products, determining the shipping quantity for the selected product which makes the minimum relative profit with respect to the other products maximal, and deciding the price corresponding to the shipping quantity.

2. The shipping planning system according to claim 1, wherein, when material resource Rn (n=1, 2, 3 . . . ) is commonly used in production of the specified product X and other product Y, said analyzing means uses the data table of the additional variable cost, said price/quantity relationship data and said resource configuration master for each shipping quantity, calculates a marginal profit procured by shipment of a certain product X by Mx=(price corresponding to the shipping quantity of the product X)×(the shipping quantity of the product X)−(additional variable cost corresponding to the shipping quantity of the product X), calculates a shipment affection coefficient from the product X to the product Y by Exy=max{(usage of the material resource Rn for each product X)/(usage of the material resource Rn for each product Y)}, obtains the least value among a value of the shipping quantity of the product X×a value of Exy, a value of the available shipping quantity of the product Y calculated by said calculating means for calculating the available shipping quantity for each product, and the maximal value of the shipping quantity of the product Y defined in the price/quantity relationship data as a number of the product Y that cannot be shipped according to the number of the product X, calculates the Opportunity Loss with the product Y by Ly=(price corresponding to the number of the product Y that cannot be shipped)×(the number of product Y that cannot be shipped)−(additional variable cost corresponding to the number of the product Y that cannot be shipped), and calculates the relative profit for the product Y with shipment of the product X by Mx−Ly.

3. The shipping planning system according to claim 1, further comprising:

a display means for displaying a marginal profit according to the shipping quantity or the relative profit for the shipping quantity with respect to the another product based on the relative profit calculated by said analyzing means, wherein said deciding means decides a specified product as a product to be shipped according to a selection input instruction by a user, obtains the shipping quantity and the price, and registers them as the shipping quantity/price plan.

4. The shipping planning system according to claim 1, further comprising:

an updating means for calculating the amount of materials and the production capacity required for meeting said shipping quantity by using said resource configuration master, said resource master, said material inventory data, said material storage planning data and said production capacity data for said shipping quantity decided by said deciding means, updating the amount of inventory available for the material, the available amount of storage planned materials and available capacity, and registering them in the material inventory data, the material storage planning data and the production capacity data; and a registering means for registering said shipping quantity/price plan until there is finally no product with a profit increase capability by repeating each process of the calculating means for calculating additional variable cost, the analyzing means, and the deciding means for the remaining products by making said updated material inventory data, material storage planning data and production capacity data as input to said calculating means for calculating the available shipping quantity for each product.

5. The shipping planning system according to claim 1, wherein, for said price/quantity relationship data in which relationship between a price of the product and the shipping quantity are registered, both the upper limit and the lower limit of the price are decided for each product, and wherein the price has a relationship of monotonously decreasing as the number increases and represented by continuous or discrete functional relationship, and created as data for which the upper limit of the numbers corresponding to the lower limit of the price in advance to be stored in said memory means.

* * * * *